Nov. 8, 1960 W. C. FOSTER 2,959,138
TRAVERSING APPARATUS
Filed April 27, 1954 2 Sheets-Sheet 1
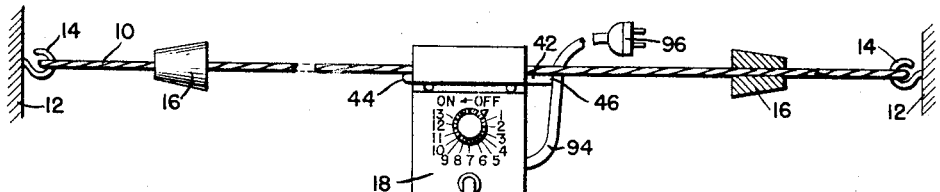
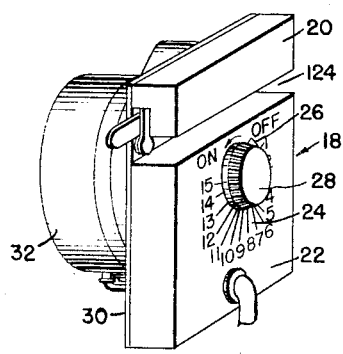
FIG. 2.
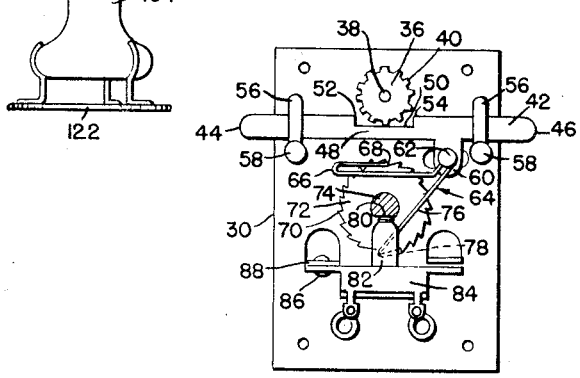
FIG. 3.
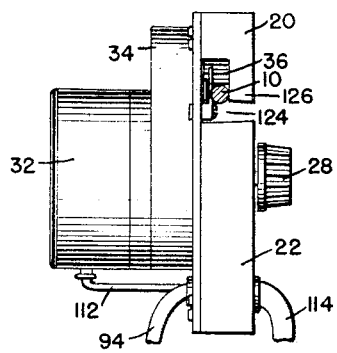
FIG. 4.
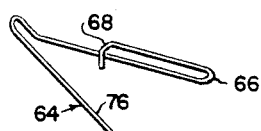
FIG. 6.
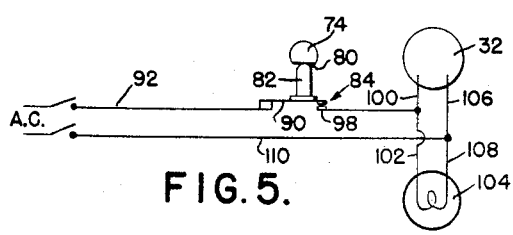
FIG. 5.
INVENTOR
William C. Foster
BY Raymond Wootton
ATTORNEY Nov. 8, 1960  W. C. FOSTER  2,959,138
TRAVERSING APPARATUS
Filed April 27, 1954  2 Sheets-Sheet 2

INVENTOR
William C. Foster
BY
ATTORNEY

United States Patent Office 2,959,138
Patented Nov. 8, 1960

2,959,138

TRAVERSING APPARATUS

William Charles Foster, 2511 St. Paul St., Baltimore 18, Md.

Filed Apr. 27, 1954, Ser. No. 426,012

15 Claims. (Cl. 104—151)

This invention relates to traversing apparatus and is particularly adapted for use with therapeutic lamps employed to scan a surface.

Conventionally, therapeutic lamps are supported above a subject in fixed positions, with or without timing mechanisms, requiring the subject or the lamp to be shifted at intervals in order to obtain uniform exposure. Frequently, a subject will fall asleep and either suffer an over-exposure, or where a timing mechanism is employed, the exposure will have been localized to the area most proximate to the lamp.

By virtue of the present invention, it is possible to direct a lamp along a prescribed path defined by a guide member, such as a track or cable, select a desired time of exposure and assure that the exposure will be uniform and of predetermined duration.

The traversing apparatus of the present invention comprises a frame adapted to travel along an elongated guide member, a driving motor mounted on the frame, a driving element carried by the frame for frictional engagement with a supporting surface, transmission means interconnecting the motor and element, reversing means carried by the frame for changing the direction of travel of the frame upon encountering an obstacle, a lamp support carried by the frame, and leads extending to the frame for supplying current to a lamp carried thereby.

Where the guide member assumes the form of a rope or cable, it can serve as a suspension to support the frame and lamp. Preferably, the guide member, whether flexible or rigid, provides a supporting surface for the frame and lamp.

The motor is preferably a self-starting alternating current motor which reverses its direction upon stalling and the reversing means includes a member engaging a portion of the transmission to stall the motor upon encountering an obstacle.

A switch in circuit with the leads is actuated by the reversing means and for this purpose a cam may be employed and/or a ratchet and pawl mechanism.

Inasmuch as the actuating mechanism for the switch can be adjusted to operate upon a predetermined number of reversals, there is in effect a timing mechanism for the energizatoin of the lamp. The motor is also preferably in circuit with the switch so that when the switch is actuated, the motor circuit will also be broken.

The frame may contain an open slot for ready reception and removal of an elongated supported or cable, in which event a wall of the frame preferably extends below the driving element so as to overhang the support and serve as a guide with respect thereto. The driving element preferably assumes the form of a rotor for frictional engagement with the cable or other support or guide member.

A more complete understanding of the invention will follow from a description of the accompanying drawings wherein:

Fig. 1 is an elevatoin of the apparatus in one of its forms;

Fig. 2 is a perspective view of a portion of the apparatus shown in Fig. 1;

Fig. 3 is an elevation of the showing of Fig. 2 with the front cover removed;

Fig. 4 is a side elevation of the device shown in Fig. 2;

Fig. 5 is a circuit diagram applicable to the apparatus;

Fig. 6 is a perspective view of the pawl shown in Fig. 3;

Figure 7:
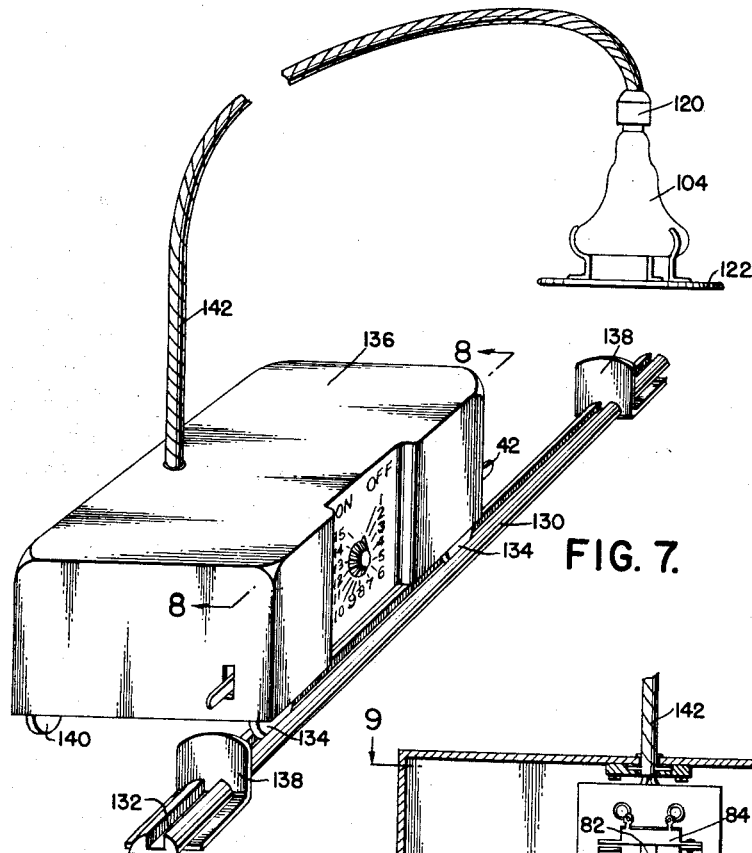
Fig. 7 is a perspective view depicting a modification.

With reference to Figs. 1 to 6 particularly, a rope or cable 10 is suspended from spaced walls or other supports 12 by means of hooks 14. Tubular stops 16 formed of rubber or the like frictionally embrace the rope or cable 10 at desired positions which may be adjusted to limit the traverse of the frame 18 to the extent desired for the area to be scanned.

The frame is provided with upper and lower cover members 20 and 22 respectively, the lower cover member having graduations 24 applied thereto to indicate with respect to a pointer 26 carried by a knob 28, the relative duration of operation of the device.

The frame 18 includes a plate 30, to the rear surface of which are secured a motor 32 and reduction gearing 34 constituting transmission means for the driving element 36 carried forwardly of the plate 30 on a shaft 38.

The driving element 36 has been depicted as bearing teeth 40 whose primary purpose is to facilitate stalling of the motor in cooperation with a reversing means comprising a reciprocable bar 42. The bar has ends 44 and 46 projecting beyond the plate 30 and is provided with a central reduced portion 48 defining a notch 50 whose corners 52 and 54 alternately jam against the teeth 40 to stall the motor when the ends of the bar encounter one or the other of the stops 16. Since it is a characteristic of self-starting synchronous motors to start in either direction, as will be indicated by the disclosure of the patent to Schellens, No. 2,436,231, dated February 17, 1948, whenever the motor 32 is stalled to prevent further movement in one direction, it will resume operation in the reverse direction. The bar 42 is positioned with respect to the plate 30 for its relative movement, by means of guides 56 suitably attached to the plate 30 as by rivets 58. A downwardly directed lug 60, as viewed in Fig. 3, has suitably secured thereto, as by means of a rivet 62, a pawl 64 formed from spring wire having an upper reversely bent leg 66 terminating in a hooked end 68 for engagement with the teeth 70 of a ratchet wheel 72 secured to a cam 74. The pawl 64 also has a lower leg 76 disposed at an acute angle to and lying in a common plane with the upper leg 66, the lower leg terminating in a hooked end 78 for likewise engaging the teeth 70 of the ratchet wheel 72. With this arrangement, when the end 44 of the bar 42 engages its stop 16, the lower leg 76 of the pawl 64 will drive the ratchet wheel 72 counterclockwise as viewed in Fig. 3 through a predetermined angular movement. During this action, the hooked end 68 of the upper leg of the pawl will yield upwardly due to its resilience to permit movement of the ratchet wheel. When the apparatus reaches the other limit of its travel and the end 46 of the bar 42 engages its stop 16, then the hooked end 68 of the upper leg of the pawl will drive the ratchet wheel 72 counterclockwise while the hooked end 78 of the lower leg 76 will yield downwardly due to its resilience to permit movement of the ratchet wheel.

As depicted in Fig. 3, the cam 74 has a flat surface 80 overlying a post 82 of a switch 84 secured by means of a rivet 86 to a struck-up lug 88 integral with the plate 30. As shown in Fig. 5, with the cam in this position, the switch 84 is open by virtue of the resilience of its leaf 90 or a suitable spring, not shown. The switch is interposed in a lead 92 provided in a supply line 94 adapted to be connected with a source of current by means of a plug 96. The fixed terminal 98 of the switch is connected with a lead 100 to supply the motor 32 and a lead 102 to energize a lamp 104. Another motor lead 106 and a second lamp lead 108 are connected with a return lead 110 carried by the supply line 94. The leads 100 and 106 are suitably combined as a cable 112 and similarly, the lamp leads 102 and 108 are combined in a cable 114, depending from the frame 18.

The length of the cable 114 is rendered adjustable by passing it through two openings in a plate 116 to form a loop 118 so that the lamp 104 carried by the socket 120 can be elevated or lowered with respect to the surface to be exposed. A protective frame 122 is snapped over the end of the lamp to protect both the lamp itself against fracture and any article or person against conducted heat.

The upper cover member 20 defines a slot 124 with the lower cover member 22 to receive the rope or cable 10. The upper cover member also provides a depending skirt 126 to overhang the rope or cable 10 and prevent accidental deflection of the frame from its prescribed path.

By the use of suitable disposition of masses, the apparatus of the present invention is balanced so as to assume an erect position when it is completely assembled as depicted in Fig. 1. This balanced condition assures a uniform contact between the driving element 36 and the cable 10 so that movement will occur at a substantially uniform rate.

Whereas the operation of the apparatus will be evident from the foregoing description, it may be summarized as follows: A supporting member 10 is stretched between two points to establish a path for the lamp 104. Stops 16 are shifted with respect to the support 10 to establish limits for the travel of the lamp. The traversing device is applied to the support 10 which enters through the slot 124 and passes upwardly into engagement with the driving element 36. The knob 28 is adjusted by rotation until its pointer 26 indicates with respect to the graduations 24 the number of alternations of traverse desired, which will be a function of time for the apparatus to move from one stop 16 to the other. The plug 96 will be inserted into a convenient outlet whereupon the motor will start in one direction or the other and the apparatus move on the support 10 accordingly. When the bar 42 engages one of the stops 16, the direction of travel will be reversed and these reversals will continue until the flat portion 80 of the cam 74 overlies the post 82 of the switch 84 whereupon the motor and lamp circuits will be broken and the apparatus rendered inactive.

With reference to the modification shown in Figs. 7, 8 and 9, the actuating mechanism is precisely the same as described with reference to the preceding figures and accordingly, insofar as possible, the reference characters are the same. The modification differs primarily by the manner in which it is supported on a surface such as a floor and guided by a channel or track 130 which can assume the form of a commercially available extruded rubber channel whose groove 132 receives one or more wheels 134 supporting a housing 136 for prescribed travel along the track between limits defined by adjustable stops 138. The stops may be defined by angular members whose vertical legs are perforated to complement the track 130 in such a way that the stops can be applied over the ends of the track and moved to any desired position with respect thereto.

The housing 136 is also supported by one or more rear wheels 140 for engagement with the floor or other surface supporting the apparatus. A flexible tubular housing 142 is secured to the housing 136 in a suitable manner, to the end of which the lamp socket 120 is connected to receive the lamp 104 and its protective frame 122. In this case, the lamp leads 102 and 108 will extend through the flexible tube 142 to supply the lamp and the tube itself will be adjustable to permit desired positioning of the lamp with regard to height and lateral distance from the track.

The shaft 38 carrying the toothed element 36 has been extended in this case to receive a flanged pulley 144 for engagement with the upper surface of an endless belt 146 which is threaded over a pair of flanged pulleys 148 secured to axles 150 to which are also secured the driving wheels 134 and the rear wheels 140. These axles are supported in suitable brackets or journals 152 riveted or otherwise secured to the frame or housing 136.

Figure 8:
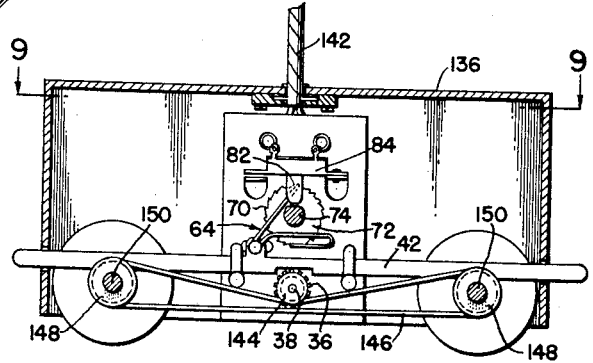
Fig. 8 is an elevation, partially in section, taken along line 8—8 of Fig. 7.
Figure 9:
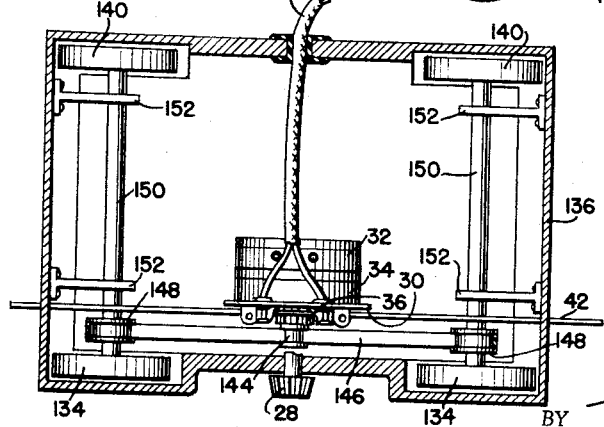
Fig. 9 is a plan view, partially in section taken along line 9—9 of Fig. 8.

Inasmuch as the mechanism depicted in Fig. 3 is duplicated in the modification as depicted in Fig. 8, it will follow that the principle of operation of the form of the invention depicted in Figs. 7, 8 and 9 will be the same. In this instance, the channel or track 130 will be placed upon the surface of a floor or table with its stops 138 adjusted to the positions desired. The wheels 134 carried by the housing 136 will be introduced into the groove 132 of the track and the tubular housing 142 will be adjusted to impart the desired position to the lamp 104. Then the supply line 94 can be connected to a suitable outlet to energize the motor and lamp. The knob 28 will of course, have been adjusted to the prescribed number of reversals so that the ends of the bar 42 will engage their respective stops 138 the prescribed number of times before effecting an opening of the switch 84. Rotation of the shaft 38 will be transferred by means of the belt 146 to the axles 150 through the flanged pulleys 144 and 148 to drive the frame back and forth between the stops until the cam 74 assumes the position depicted in Fig. 8 permitting the switch to break the circuit.

Whereas only two specific forms of the apparatus have been described with reference to the accompanying drawings, the invention should not be limited thereto beyond the scope of the appended claims.

I claim:

1. Traversing apparatus for distributing rays from a therapeutic lamp comprising a frame adapted to support a therapeutic lamp and travel back and forth along an elongated guide member, a reversible driving motor mounted on and movable as a unit with said frame, a driving element carried by said frame for frictional engagement with a supporting surface, transmission means interconnecting said motor and element, motor reversing means carried by said frame, said supporting surface providing means arranged in the path of travel of said frame cooperating with said motor reversing means, terminal means provided by said frame to which a therapeutic lamp is adapted to be connected, a switch in circuit with said terminal means, and integrating means actuating said switch as a function of a plurality of reversals of said motor.

2. Traversing apparatus as set forth in claim 1 wherein said motor is a self-starting alternating current motor which reverses its direction upon stalling and said reversing means includes a member engaging said transmission to stall said motor upon encountering an obstacle.

3. Traversing apparatus for distributing rays from a therapeutic lamp comprising a frame adapted to support a therapeutic lamp and travel back and forth along an elongated guide member, a self-starting alternating current driving motor which reverses its direction upon stalling mounted on and movable as a unit with said frame, a driving element carried by said frame for frictional engagement with a supporting surface, transmission means interconnecting said motor and element, said supporting surface providing means adapted to stall said motor arranged in the path of travel of said frame, terminal means provided by said frame to which a therapeutic lamp is adapted to be connected, a switch in circuit with said terminal means, and integrating means actuating said switch as a function of a plurality of reversals of said motor.

4. Traversing apparatus as set forth in claim 3 wherein said frame contains an open slot for ready reception and removal of said elonagted guide member.

5. Traversing apparatus as set forth in claim 3 wherein said frame includes a wall containing an open slot to receive said elongated guide member, said wall extending below said driving element to overhang said elongated guide member.

6. Traversing apparatus as set forth in claim 3 wherein said driving element is a rotor.

7. Traversing apparatus as set forth in claim 3 wherein said guide member supports said frame.

8. Traversing apparatus as set forth in claim 3 wherein said supporting surface is defined by said guide member.

9. Traversing apparatus as set forth in claim 3 wherein said guide member is flexible.

10. Traversing apparatus as set forth in claim 3 wherein said switch actuating means interconnects said switch and said motor.

11. Traversing apparatus as set forth in claim 3 wherein a lamp socket is carried by said frame having terminals in circuit with said switch.

12. Traversing apparatus as set forth in claim 3 wherein said motor has terminals in circuit with said switch.

13. Traversing apparatus as set forth in claim 3 wherein said actuating means includes a cam.

14. Traversing apparatus as set forth in claim 3 wherein said actuating means includes a ratchet and pawl mechanism.

15. Traversing apparatus as set forth in claim 3 wherein said actuating means includes an adjusting element for selecting the number of reversals of said motor for effecting operation of said switch.

References Cited in the file of this patent

UNITED STATES PATENTS

| | | |
|---|---|---|
| 588,890 | Wetmore | Aug. 24, 1897 |
| 692,118 | Clift | Jan. 28, 1902 |
| 1,019,795 | Jensen | Mar. 12, 1912 |
| 1,079,373 | Spirewfki | Nov. 25, 1913 |
| 1,669,468 | Heintze | May 15, 1928 |
| 1,774,128 | Caruso | Aug. 26, 1930 |
| 1,813,021 | Brown | July 7, 1931 |
| 1,849,825 | Cutler | Mar. 15, 1932 |
| 2,105,514 | Welch | Jan. 18, 1938 |
| 2,179,913 | Bess | Nov. 14, 1939 |
| 2,309,984 | Rogers | Feb. 2, 1943 |
| 2,343,951 | Blodgett | Mar. 14, 1944 |
| 2,436,231 | Schellens | Feb. 17, 1948 |
| 2,481,686 | Roggenstein | Sept. 13, 1949 |
| 2,519,472 | Howard | Aug. 22, 1950 |
| 2,525,464 | Springer | Oct. 10, 1950 |
| 2,532,661 | Combs | Dec. 5, 1950 |
| 2,562,979 | Yingling | Aug. 7, 1951 |
| 2,583,662 | Noble | Jan. 29, 1952 |
| 2,666,173 | Davis et al. | Jan. 12, 1954 |
| 2,711,079 | Grimshaw | June 21, 1955 |
| 2,798,195 | Lembo | July 2, 1957 |

FOREIGN PATENTS

| | | |
|---|---|---|
| 633,243 | Great Britain | Dec. 12, 1949 |